Aug. 28, 1951     R. M. WILLIAMS     2,566,049
ACCESSORY DRIVE FOR TURBO-JET ENGINES
Filed Feb. 7, 1948     3 Sheets-Sheet 1
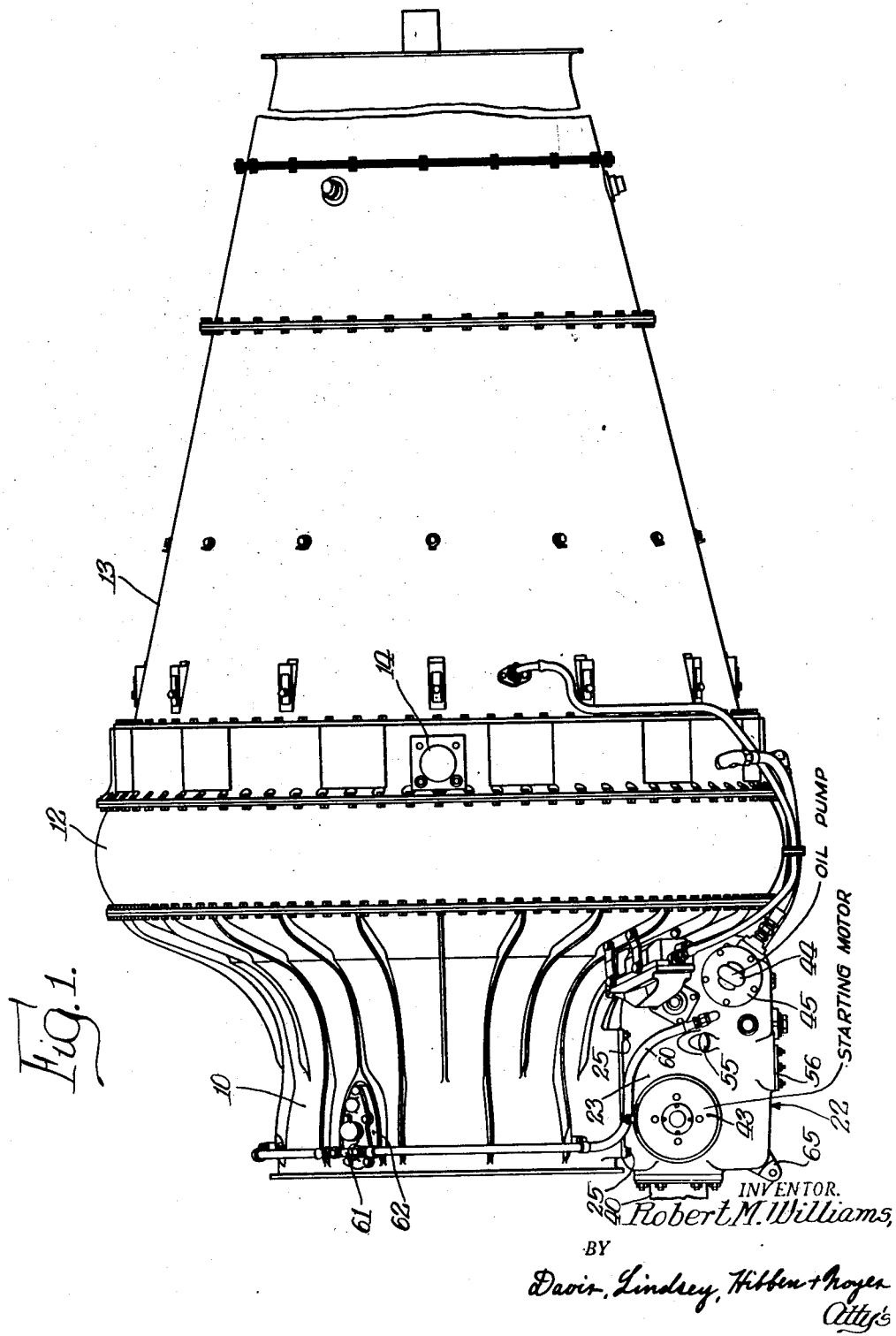
INVENTOR.
Robert M. Williams,
BY
Davis, Lindsey, Hibben + Noyes
Att'ys Aug. 28, 1951 R. M. WILLIAMS 2,566,049
ACCESSORY DRIVE FOR TURBO-JET ENGINES
Filed Feb. 7, 1949 3 Sheets-Sheet 2
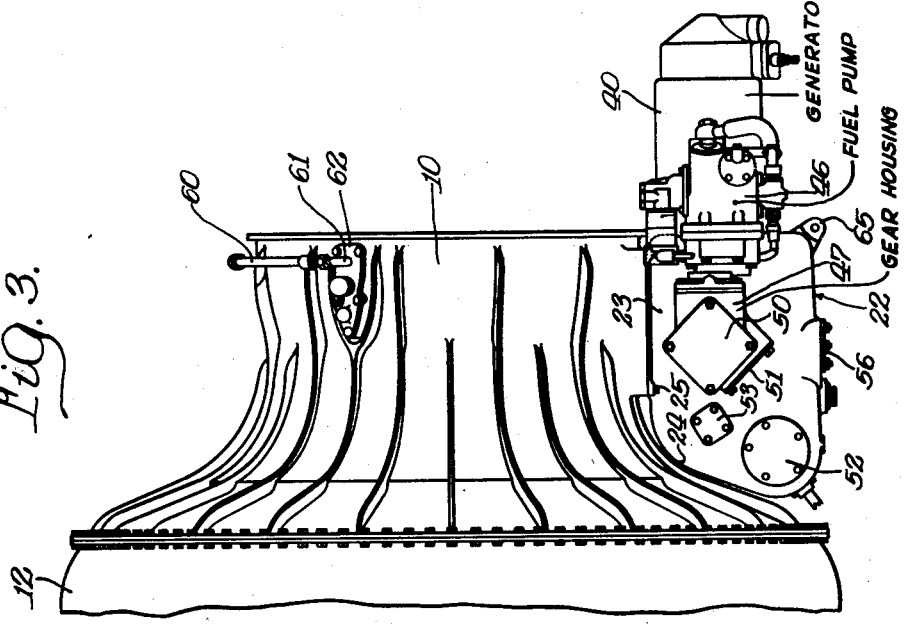
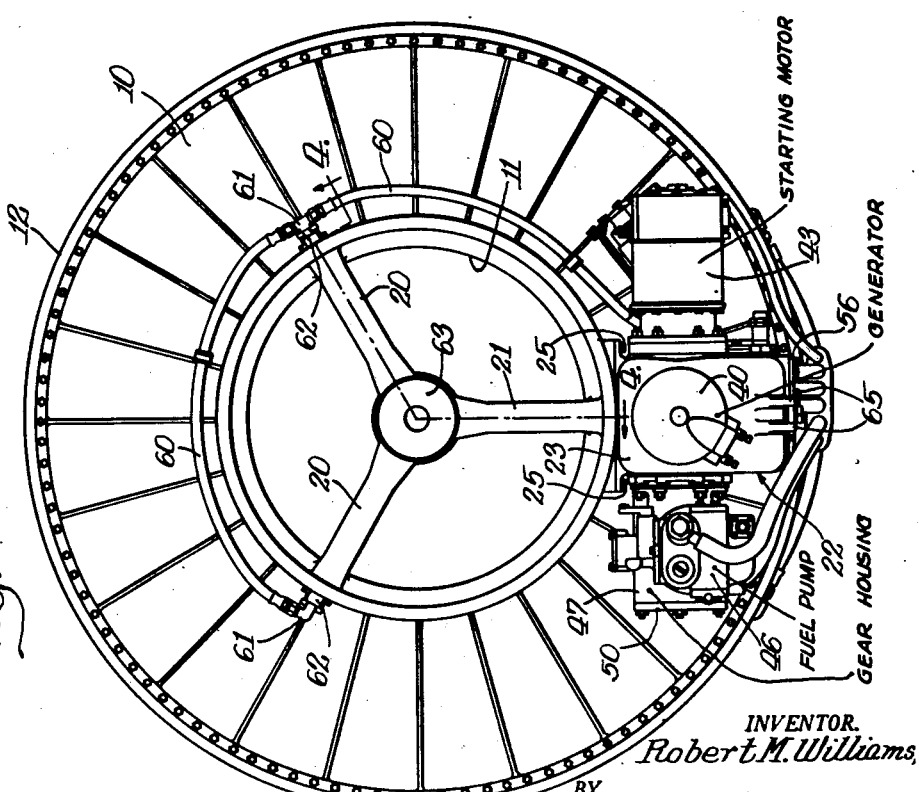
INVENTOR.
Robert M. Williams,
BY
Davis, Lindsey, Hibben & Noyes
Attys.

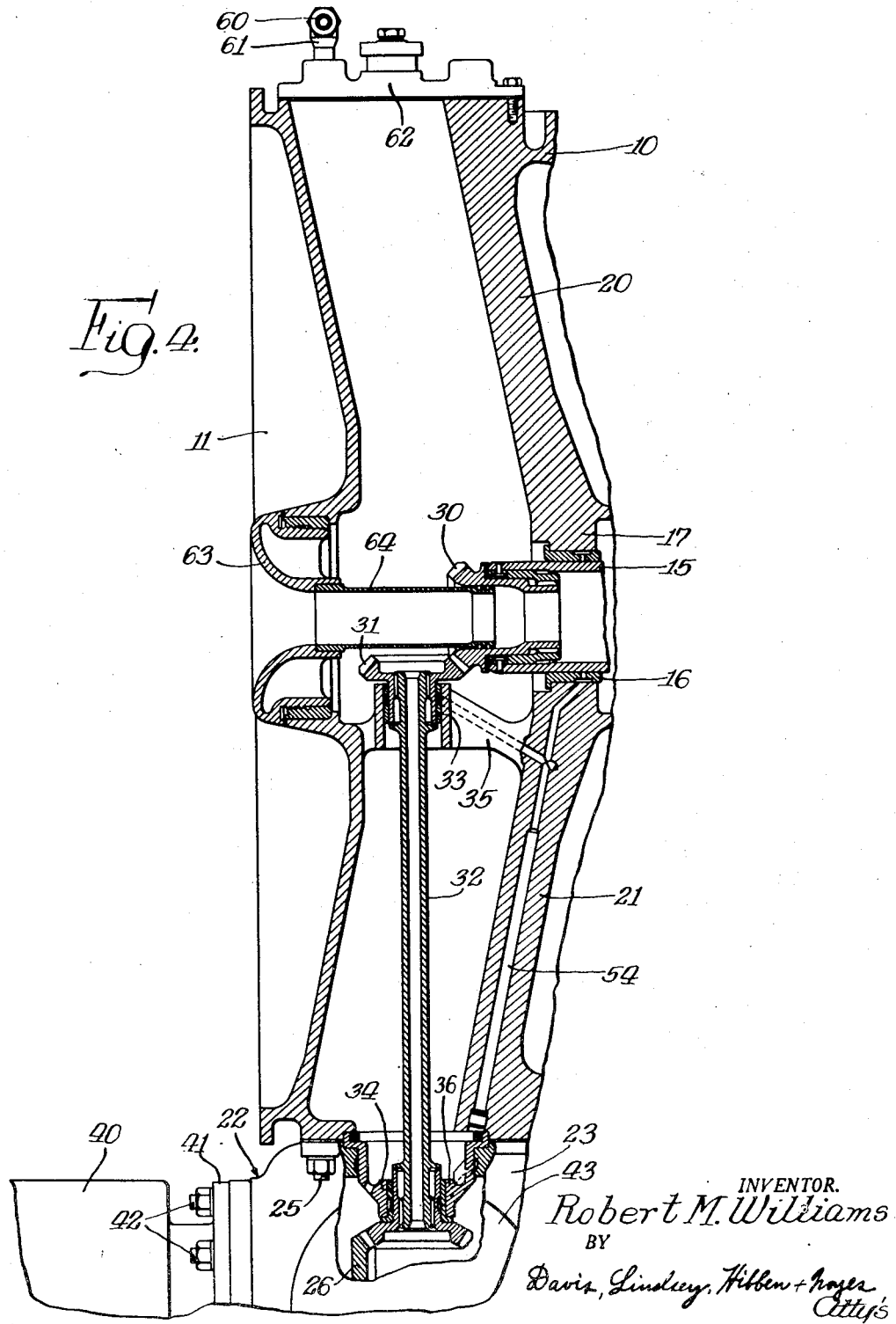

Patented Aug. 28, 1951

2,566,049

UNITED STATES PATENT OFFICE 2,566,049

ACCESSORY DRIVE FOR TURBO-JET ENGINES

Robert M. Williams, Toledo, Ohio, assignor to Packard Motor Car Company, Detroit, Mich., a corporation of Michigan Application February 7, 1948, Serial No. 6,862

6 Claims. (Cl. 60—35.6)

The invention relates generally to turbo-jet engines and more particularly to means for driving accessories for the engine.

In a turbo-jet engine, a number of accessories are required for operation of the engine, while others are optional. Thus, accessory units such as a starter motor, generator, oil pump and fuel pump may be considered essential. Other accessory units such as a tachometer, a pump for pressure fluid for operating hydraulic devices, and, if desired, auxiliary pumps both for oil and fuel may be provided. All of these units are preferably, and in some instances necessarily, driven by the engine, except, of course, the starter which drives the engine. To this end, they are provided with a driving connection with the main shaft of the engine, connecting the turbine and air compressor.

The general object of the invention is to provide a novel accessory drive constructed as a unit for mounting on the engine and having a driving connection with the main shaft of the engine, the unit being arranged to support the various accessory units and to provide a driving connection therefor.

Another object is to provide an accessory drive unit of the foregoing character, on which the various accessory units may be readily mounted, with the driving connection for each accessory unit effected by or as an incident to mounting such unit in place on the drive unit.

A further object is to provide an accessory drive unit of the foregoing character, which includes gearing providing the desired speed ratios with the main shaft of the engine for the respective accessory units.

Still another object is to provide an accessory drive unit of the foregoing character, adapted to be mounted on the engine in a manner which avoids obstruction of the air flow into the engine and which is nested into a portion of the engine without increasing the overall dimensions of the engine.

A still further object is to provide an accessory drive unit of the foregoing character, which has its driving connection with the main shaft of the engine extending through a support for the shaft.

It is also an object to provide an accessory drive unit of the foregoing character, which also constitutes a support cooperating with supports on the engine itself for mounting the engine in an aircraft.

Another object is to provide a novel means for cooling the lubricating oil used in the engine.

Other objects and advantages will become apparent from the following description taken in connection with the accompanying drawings, in which:

Figure 1 is a side elevational view of the left side of a turbo-jet engine and accessory drive unit embodying the features of the invention.

Fig. 2 is a front elevational view of the engine shown in Fig. 1.

Fig. 3 is a fragmentary side elevational view of the right side of the engine shown in Fig. 1.

Fig. 4 is an enlarged fragmentary sectional view taken on the line 4—4 of Fig. 2.

A turbo-jet engine of the character utilized in aircraft is usually in the form of an elongated body, generally circular in cross section, with an opening at its front end through which air is introduced into the engine, and an opening at its rear end through which the jet stream emerges. The body, of course, may and usually does vary in diameter throughout its length, depending upon the particular structural arrangement of the parts of the engine within the body. Thus, the engine includes as its major elements an air compressor located adjacent the air inlet at the front end of the body, and an air diffuser for delivering the air to a combustion chamber section. The combustion gases emerging from the combustion chamber section pass through a turbine for driving the compressor and are delivered to the tail cone section at the rear of the engine, from which the jet stream emerges.

As heretofore mentioned, a number of accessory units or devices are employed with an engine of this character. Thus, a starter is provided for effecting initial rotation of the turbine and air compressor to bring these elements up to a speed where the engine itself becomes self-sustaining. A generator is also provided for operating various electrical devices. Oil pumps are used for supplying lubricating oil to the shaft connecting the turbine and air compressor, as well as to bearings utilized for the drive for the various accessory devices. A fuel pump may also be operated by the engine for delivering fuel from the fuel tanks in the aircraft to the engine. Other accessory devices may include a tachometer for indicating the engine speed, and a pump for supplying pressure fluid for operating hydraulic devices used in connection with the engine or with the aircraft. In many instances, auxiliary pumps both for lubricating oil and for fuel may be provided in case the main pumps go out of service for one reason or another.

Because of limitations of space and other factors involved in aircraft design, the mounting of the various accessory devices presents somewhat of a problem in obtaining a compact structure for the engine as a whole, particularly in view of the fact that such accessory devices have a driving connection with the main shaft of the engine connecting the turbine and air compressor. Accessibility to these various accessory drives as well as easy replacement thereof on the engine are factors in the servicing of engines of this character and must be considered in the design of the engine. In the present embodiment of the invention, such factors have been given full consideration and the structure is such as to attain these ends. Thus, the invention contemplates the use of an accessory drive constructed as a unit for mounting on the engine and provided with supports and power take-offs for the various accessory devices.

In the preferred embodiment of the invention, the accessory drive unit comprises a housing which is nested in an outwardly flaring portion of the air inlet cover at the front end of the engine, at the lower side thereof. By so nesting the unit in the flare of the inlet cover, an increase in the overall dimensions of the engine is avoided. The housing is of generally rectilinear form except for its upper surface, which conforms to the flare of the inlet cover, and thus provides two side faces as well as a front face on which the various accessory devices may be mounted. Within the housing is drive gearing constructed to provide for drive connections with the various devices when they are mounted on the unit. The gearing within the housing is connected to the main shaft of the engine and, to this end, a drive connection for the gearing is provided, which extends through a radial strut within the inlet cover supporting a bearing portion for the main shaft. Thus, while a driving connection between the accessory devices and the gearing within the housing is established as an incident to mounting each device in place on the housing, a driving connection between the gearing within the housing and the main shaft of the engine is established as an incident to mounting the housing on the inlet cover. With this arrangement, the various accessory devices are readily replaceable on the accessory unit, and similarly the unit itself is readily replaceable on the engine.

As heretofore mentioned, one of the accessory devices is an oil pump mounted on the unit. The housing of the unit preferably constitutes a sump for oil either draining or pumped back from the bearings in the engine. This oil pump withdraws the oil from the sump and discharges the oil into certain of the struts in the air inlet. By so doing, the heat picked up by the oil in passing through the engine will be dissipated and the oil will be cooled in passing through such struts. Supplying oil to such struts has other features in that it lubricates the driving connection between the accessory unit and the main shaft, and the dissipation of heat from the oil in passing through the struts has the advantage of sufficiently heating the struts to prevent them from icing. The engine itself is carried in an aircraft by means of trunnions supported by pads or lugs located horizontally opposite each other on the main body of the engine substantially at the point of maximum diameter thereof. The accessory drive unit being mounted on the lower side of the inlet cover is also provided with a mounting lug at its lower front edge cooperating with the trunnions to support the engine in the aircraft.

The form of engine illustrated in the drawings comprises an inlet cover 10 having a central opening 11 (see Fig. 2) preferably round in form, through which air is drawn into the engine. In an engine of the form considered herein, the inlet cover 10 flares rearwardly and outwardly from the front end, as clearly illustrated in Figs. 1 and 3. Within the inlet cover is located an air compressor (not shown) for drawing the air inwardly through the opening 11 and discharging it into a diffuser section indicated at 12. The diffuser section in the present form of engine constitutes the portion of the engine having the maximum diameter. Rearwardly of the diffuser section 12, the engine comprises a casing structure tapering rearwardly, as indicated at 13, to provide a combustion chamber section, a turbine section and a tail cone from which the jet stream emerges. Formed on the diffuser section 12 or adjacent thereto is a pair of mounting lugs or pads 14 to receive trunnions on which the engine is mounted in the aircraft. The trunnions are located horizontally opposite each other and are substantially at the point of maximum diameter of the engine body.

The air compressor and turbine are coupled with each other by a main shaft, the front end of which is shown at 15 in Fig. 4. This shaft in the present form of engine is tubular in form to carry air introduced at the front of the engine into the shaft and conducted by the shaft to the turbine for cooling purposes. The main shaft 15, at its front end, is journaled in a bearing 16 carried in a bearing support 17 formed at the juncture of a plurality of radially extending struts 20 and 21. The struts are hollow for purposes hereinafter described and are preferably integrally formed as part of the inlet cover 10, the struts being located immediately inside the front end of such inlet cover. In the present instance, three struts are shown, the two struts 20 extending upwardly and outwardly from the center of the inlet opening 11 and the strut 21 extending downwardly therefrom, as shown in Fig. 2.

As heretofore mentioned, the accessory drive unit, indicated generally at 22, is mounted on the inlet cover 10, at the lower side thereof, and is nested in the outwardly flaring exterior surface of the inlet cover so as not to extend beyond the maximum dimensions of the engine itself. The accessory drive unit 22 comprises a generally rectilinear housing 23 having its upper and rear surface curved, as indicated at 24 in Fig. 3, to fit snugly in the flaring portion of the inlet cover 10. The housing 23 is provided with a flange adapted to be secured to the underside of the inlet cover as by bolts 25. Because of the above-mentioned location of the accessory drive unit 22, it is thus positioned adjacent the lower end of the strut 21. Housing 23 encloses gearing fragmentarily illustrated at 26 in Fig. 4.

To provide a driving connection for the gearing 26 with the main shaft 14, a bevel gear 30 is mounted on the front end of the main shaft 15 and meshes with another bevel gear 31 carried on the upper end of an accessory drive shaft 32. The latter extends vertically downward through the strut 21 and into the accessory drive unit housing 23 and is journaled in bearings 33 at its upper end and 34 at its lower end. The bearing 33 is carried in a spider 35 formed integrally with the strut 21, while the bearing 34 is carried in a dished support 36 mounted in the accessory drive housing 23 where the latter connects with the strut 21. Thus, the gearing 26 within the accessory drive unit 22 is driven from the main shaft 15.

The principal function of the accessory drive unit 22 is to support and drive the various accessory devices as heretofore described. These devices are mounted on and are secured to the side faces as well as the front face of the housing 23, apertures being provided in such housing for a driving connection between each device with the gearing 26 within the housing. To illustrate a number of such accessory devices, I have shown a generator 40 carried on the front face of the housing 23. To secure the generator 40 thereto, it is provided with a flange 41 secured to the housing by a plurality of studs 42. The drive connection between the gearing 26 and the generator 40 thus extends through the flange 41 and is enclosed thereby. On one side face of the housing 23, the left side in this instance, I may mount a starter motor 43 adjacent the front end of the housing. The starter motor 43 may have the same type of mounting on the housing 23 and the same type of driving connection with the gearing 26 as the generator 40. On the same side of the housing 23 I may also mount an oil pump 44 (see Fig. 1) which, in the present instance, is shown as carried on a mounting plate 45 and extends into the housing 23.

On the opposite side face of the housing 23, a fuel pump 46 may be carried. In the present instance, the fuel pump 46 is shown as being mounted on an auxiliary gear housing 47 with the latter mounted on and secured to the side face of the housing 23. The auxiliary gear housing 47 is to provide additional points at which other devices may be mounted, if desired, for connection with the gearing 26. In the present instance, the auxiliary gear housing 47 is shown as being provided with cover plates 50 and 51 (see Fig. 3) where such other devices may be mounted. Such devices in the present instance are not illustrated and the cover plates are shown to cover the opening in the auxiliary gear housing 47 over which such other devices are mounted. On the same side of the accessory drive unit as the pump 46, other openings, covered in the present instance by plates 52 and 53, are provided for still other devices, such as a tachometer, a pump for pressure fluid for operating hydraulic devices, or auxiliary fuel and oil pumps. If it is desired to mount still more auxiliary devices, units similar to the unit 22 may be mounted at the outer ends of the two struts 20. However, in ordinary usage, such additional drive units are not necessary.

Oil supplied by the oil pump 44 may be conducted to the bearing 16 for the main shaft 15 and to the bearings 33 and 34 for the auxiliary drive shaft 32. To this end, an oil duct 54 having a connection (not shown) with the oil pump 44 may be provided in the strut 21. Oil under pressure is supplied to the duct 54 and is led to the three bearings 16, 33 and 34 by branch passages from the duct 54. The oil working out of these bearings is free to drain downwardly through the interior of the strut 21 and into the housing 23. The oil in entering the housing 23 lubricates the gearing 26 therein and drains to the bottom of the housing which constitutes a sump from which the oil is drawn by the pump 44. The oil pump 44 is also provided with connections for supplying oil to other bearings for the main shaft 15 and the oil draining from such other bearings is pumped back into the housing 23. To maintain the supply of oil in the sump provided by the housing 23, an oil filler opening and oil depth gauge 55 (see Fig. 1) may be provided on the side wall of the housing 23. A plate 56 secured over an opening in the bottom face of the housing 23 may be provided for additional apparatus.

One of the features of the invention lies in the structure whereby the heat acquired by the oil in passing through the bearings of the main shaft may be dissipated and such heat utilized for another purpose. Thus, oil from the main shaft bearings may be circulated by the oil pump 44 through a pipe 60 (see Figs. 1, 2 and 3) and discharged into the upper ends of the struts 20 through suitable fittings 61. The fittings 61 are mounted in caps 62 enclosing the outer ends of the struts 20. The oil discharged from fittings 61 into the interior of the struts 20 contacts the walls thereof and loses its heat to such walls. The oil is thus cooled in passing through the struts 20. The heat dissipated to the walls of the struts 20 has the further function of heating such walls so that ice will not form on the exterior of the struts from the moisture carried in the air drawn inwardly through the inlet opening 11. The oil draining downwardly through the struts 20 also provides lubrication for the bevel gears 30 and 31 and will drain back to the sump in the housing 23 through the lower strut 21.

As heretofore mentioned, the main shaft 15 is tubular to conduct air for cooling purposes to the turbine. Such air is drawn from the inlet opening 11 in the inlet cover. However, since oil flows downwardly through the struts 20 into the strut 21, such oil must be prevented from entering the interior of the main shaft 15. To this end, the juncture of the struts 20 and 21 is provided with a centrally apertured cap 63, and a sleeve member 64 (see Fig. 4) is carried by the cap and extends into the hub of the bevel gear 30 so as to prevent oil from entering the interior of the main shaft 15.

Another feature of the present invention lies in the utilization of the auxiliary drive unit 22 for the function of assisting in supporting the engine in an aircraft. As heretofore mentioned, the pads 14 horizontally opposite each other intermediate the ends of the engine, are mounted on trunnions carried by the aircraft. As a third point of support for the engine, the housing 23, at its lower front edge, is provided with a pair of ears 65 by which the front end of the engine may be anchored to the aircraft. The engine is thus supported at the three points comprising the two mounting pads 14 and the ears 65.

I claim:

1. In a turbo-jet engine, an air inlet cover having an external surface curving rearwardly and outwardly from the front end thereof and having a plurality of hollow radial struts carrying a bearing support centrally of the cover, a main engine shaft journaled in said bearing support, an accessory drive unit mounted on the exterior of said cover adjacent the outer end of one of said struts and nested in said curving surface, drive gearing in said unit, a drive shaft having a bevel gear connection with said main shaft and extending through said one strut for connection with said gearing, said unit providing an oil sump, an oil pump for pumping oil from said sump, and piping connecting said oil pump to the outer ends of the other struts for supplying oil to said bevel connection with the oil draining through said one strut to said sump.

2. In a turbo-jet engine, an inlet cover providing a round opening for the flow of air into the engine and having a plurality of hollow radial struts providing a bearing support at their juncture for the main shaft of the engine, one of said struts extending downwardly and the other strut or struts extending upwardly, an accessory drive unit mounted on the exterior of said cover adjacent said one strut and having an oil sump, an oil pump carried by said unit for drawing oil from said sump, and piping for delivering oil from the pump to outer end of said other strut or struts with the oil draining back to said sump through said one strut, the oil being cooled by passage through said struts with the heat preventing icing of said struts.

3. In a turbo-jet engine, an inlet cover having an opening for admitting air to the engine, a bearing support for the main shaft of the engine located centrally of said opening and having a plurality of hollow struts extending outwardly therefrom to the cover, one of said struts extending downwardly and the other strut or struts extending upwardly, casing structure located at the lower end of said one strut and providing a sump for engine lubricating oil, and an oil pump for drawing oil from said sump and connected to discharge oil into the outer ends of said other strut or struts, whereby the oil is cooled in passing through said struts and the heat removed from the oil prevents icing of the struts.

4. In a turbo-jet engine, an inlet cover having an opening for admitting air to the engine, a bearing support located centrally of said opening, a main shaft for the engine having its front end mounted in said bearing support, said main shaft being hollow for conducting cooling air to the engine, a plurality of hollow struts extending from said bearing support to said cover, an accessory drive shaft extending through one of said struts and having a bevel gear connection with said main shaft, an oil pump for delivering oil to certain of said struts to permit the oil to flow through such struts to said bevel gear connection, said struts at their juncture having an aperture for admitting air to said main shaft, and a sleeve extending from said aperture to said main shaft to prevent the oil passing through said struts from entering the interior of said main shaft.

5. A turbo-jet engine having external casing structure, mounting lugs provided at the sides of said casing structure intermediate its ends for supporting the engine in an aircraft, said casing structure including an air inlet cover at its front end, and an accessory drive unit secured to the lower side of said inlet cover and having a mounting lug for additionally supporting the engine in the aircraft.

6. A turbo-jet engine comprising a casing structure flaring rearwardly and outwardly from its front end to a point of maximum diameter intermediate its ends and tapering rearwardly from said point, a pair of mounting lugs located horizontally opposite each other on said casing structure substantially at said point of maximum diameter, and an accessory drive unit nested in the flaring portion of said casing structure at the lower side thereof and having a mounting lug at its front end for additionally supporting the engine in the aircraft.

ROBERT M. WILLIAMS.

REFERENCES CITED

The following references are of record in the file of this patent:

UNITED STATES PATENTS

| Number | Name | Date |
|---|---|---|
| 2,441,135 | Chalupa | May 11, 1948 |

OTHER REFERENCES

"The De Havilland Ghost (DGT/50)" in Flight, Feb. 6, 1947, pages 142a–b and 144.

"Metro-Vick Gas Turbine" in Flight, April 25, 1946, pages 420a–b.

"Design Analysis of Messerschmitt Me-262 Jet Fighter" in Aviation, Nov. 1945, pages 121–123.